United States Patent
Ramanathan et al.

(10) Patent No.: US 10,261,661 B2
(45) Date of Patent: Apr. 16, 2019

(54) REFERENCE POSITION IN VIEWER FOR HIGHER HIERARCHICAL LEVEL

(71) Applicant: Oracle International Corporation, Redwood Shores, CA (US)

(72) Inventors: Jairam Ramanathan, Waltham, MA (US); Prashant Singh, Lexington, MA (US); Yi Dai, Winchester, MA (US); Jindrich Dinga, Santa Clara, CA (US); David Kamholz, Lyons, CO (US)

(73) Assignee: Oracle International Corporation, Redwood Shores, CA (US)

( * ) Notice: Subject to any disclaimer, the term of this patent is extended or adjusted under 35 U.S.C. 154(b) by 264 days.

(21) Appl. No.: 14/684,159

(22) Filed: Apr. 10, 2015

(65) Prior Publication Data

US 2015/0378528 A1 Dec. 31, 2015

Related U.S. Application Data

(60) Provisional application No. 62/017,214, filed on Jun. 25, 2014, provisional application No. 62/053,638, filed on Sep. 22, 2014.

(51) Int. Cl.
*G06T 11/20* (2006.01)
*G06T 13/80* (2011.01)
(Continued)

(52) U.S. Cl.
CPC ........ *G06F 3/0482* (2013.01); *G06F 3/04817* (2013.01); *G06F 3/04842* (2013.01);
(Continued)

(58) Field of Classification Search
CPC ............... G06F 3/0482; G06F 3/04842; G06F 3/04817; G06F 3/04883; H04L 67/10; G06T 11/206; G06T 13/80; G06T 2200/24

See application file for complete search history.

(56) References Cited

U.S. PATENT DOCUMENTS 5,606,654 A * 2/1997 Schuur ............... G09G 5/00
345/440
5,721,853 A * 2/1998 Smith ............... G06F 3/0481
715/790
(Continued)

OTHER PUBLICATIONS

Racoma; J. Angelo—"Workday for iPad Launches; Makes ERP More Intuitive With 'Swirls' Interface" obtained at http://www.cmswire.com/cms/information-management/workday-for-ipad-launches-makes-erp-more-intuitive-with-swirls-interface-012252.php#null; Aug. 5, 2011; 5 pages.
(Continued)

*Primary Examiner* — Justin R. Blaufeld
(74) *Attorney, Agent, or Firm* — Trellis IP Law Group, PC

(57) ABSTRACT

A system and method for facilitating preservation of context information during navigation of a visualization. An example method includes representing hierarchical data via an orbit visualization; providing a first user option to navigate to a child node selected from among the one or more child nodes of the orbit visualization; and updating the orbit visualization in response to user selection of the first user option, resulting in an updated orbit visualization, wherein the updated orbit visualization includes a parent node positioned at a periphery of the visualization, and wherein the selected child node is positioned as a new central node of the updated orbit visualization. A carousel control may be displayed concurrently with the orbit visualization, wherein the carousel control includes one or more user options to navigate to a previously navigated-to node of the orbit visualization.

20 Claims, 8 Drawing Sheets

(51) Int. Cl.
*H04L 29/08* (2006.01)
*G06F 3/0481* (2013.01)
*G06F 3/0482* (2013.01)
*G06F 3/0484* (2013.01)
*G06F 3/0488* (2013.01)

(52) U.S. Cl.
CPC ........ *G06F 3/04883* (2013.01); *G06T 11/206* (2013.01); *G06T 13/80* (2013.01); *G06T 2200/24* (2013.01); *H04L 67/10* (2013.01)

(56) References Cited

U.S. PATENT DOCUMENTS

| | | | | |
|---|---|---|---|---|
| 6,111,578 | A * | 8/2000 | Tesler | G06T 11/206 345/419 |
| 6,154,213 | A * | 11/2000 | Rennison | G06F 17/30716 345/428 |
| 6,448,987 | B1 * | 9/2002 | Easty | G06F 3/0482 715/834 |
| 7,315,985 | B1 * | 1/2008 | Gauvin | H04L 41/12 715/734 |
| 8,769,438 | B2 * | 7/2014 | Mangum | G06F 3/0488 715/784 |
| 9,063,563 | B1 * | 6/2015 | Gray | G06F 3/01 |
| 9,223,463 | B1 * | 12/2015 | Kawaguchi | G06F 3/0481 |
| 9,258,195 | B1 * | 2/2016 | Pendleton | H04L 41/12 |
| 9,292,052 | B2 * | 3/2016 | Hsu | G06F 3/0488 |
| 9,786,071 | B2 * | 10/2017 | Fulford | G06T 11/60 |
| 2002/0113816 | A1 * | 8/2002 | Mitchell | G06F 3/0481 715/734 |
| 2002/0147805 | A1 * | 10/2002 | Leshem | G06F 11/32 709/223 |
| 2003/0210284 | A1 * | 11/2003 | Vandruff | G06F 17/30994 715/853 |
| 2004/0095395 | A1 * | 5/2004 | Kurtenbach | G06F 3/0482 715/810 |
| 2004/0215764 | A1 * | 10/2004 | Allen | H04L 41/12 709/224 |
| 2005/0273730 | A1 * | 12/2005 | Card | G06F 17/30873 715/853 |
| 2005/0289478 | A1 * | 12/2005 | Landman | G06F 3/048 715/804 |
| 2006/0036568 | A1 * | 2/2006 | Moore | G06F 17/30126 |
| 2006/0059435 | A1 * | 3/2006 | Molesky | G06F 3/0485 715/786 |
| 2007/0192739 | A1 * | 8/2007 | Hunleth | G06F 3/0481 715/823 |
| 2007/0198949 | A1 * | 8/2007 | Rummel | G06F 3/0482 715/810 |
| 2007/0208840 | A1 * | 9/2007 | McConville | H04L 41/22 709/223 |
| 2007/0250793 | A1 * | 10/2007 | Miura | G06F 3/0482 715/810 |
| 2007/0261007 | A1 * | 11/2007 | Hutcheson | G06F 3/0482 715/853 |
| 2009/0007015 | A1 * | 1/2009 | Mandic | G06F 3/0482 715/834 |
| 2009/0327963 | A1 * | 12/2009 | Mouilleseaux | G06F 3/0482 715/834 |
| 2010/0058165 | A1 * | 3/2010 | Bhattacharya | H04L 63/1416 715/227 |
| 2010/0269040 | A1 * | 10/2010 | Lee | G06F 3/04817 715/702 |
| 2010/0287512 | A1 * | 11/2010 | Gan | G06F 17/30572 715/854 |
| 2011/0093815 | A1 * | 4/2011 | Gobeil | G06F 3/0482 715/825 |
| 2011/0239163 | A1 * | 9/2011 | Mochizuki | G06F 3/0482 715/853 |
| 2011/0265041 | A1 * | 10/2011 | Ganetakos | A63F 13/533 715/834 |
| 2011/0289459 | A1 * | 11/2011 | Athans | G06F 3/0481 715/854 |
| 2011/0316884 | A1 * | 12/2011 | Giambalvo | G06F 17/30058 345/660 |
| 2012/0036484 | A1 * | 2/2012 | Zhang | H04L 41/12 715/853 |
| 2012/0272144 | A1 * | 10/2012 | Radakovitz | G06F 3/04883 715/702 |
| 2013/0014053 | A1 * | 1/2013 | Cabrera-Cordon | G06F 3/0488 715/810 |
| 2013/0019173 | A1 * | 1/2013 | Kotler | G06F 3/0482 715/711 |
| 2013/0024811 | A1 * | 1/2013 | Gleadall | G06F 3/0482 715/810 |
| 2013/0067398 | A1 * | 3/2013 | Pittappilly | G06F 3/0482 715/800 |
| 2013/0117705 | A1 * | 5/2013 | Ting | H04M 1/67 715/781 |
| 2013/0223614 | A1 * | 8/2013 | Tuchman | H04M 3/523 379/265.09 |
| 2013/0227474 | A1 * | 8/2013 | Dondurur | G06F 3/0482 715/808 |
| 2013/0332378 | A1 * | 12/2013 | Brown | G06Q 10/105 705/319 |
| 2013/0336578 | A1 * | 12/2013 | Sakashita | C04B 38/00 382/154 |
| 2014/0026104 | A1 * | 1/2014 | Tokita | G06F 3/04817 715/854 |
| 2014/0047361 | A1 * | 2/2014 | Gaspar | G06F 3/048 715/762 |
| 2014/0053110 | A1 * | 2/2014 | Brown | G06F 3/0481 715/853 |
| 2014/0081692 | A1 * | 3/2014 | Bickell | G06Q 10/06311 705/7.17 |
| 2014/0095972 | A1 * | 4/2014 | Molesky | G06F 17/211 715/227 |
| 2014/0282114 | A1 * | 9/2014 | Walkin | H04L 51/32 715/758 |
| 2014/0354650 | A1 * | 12/2014 | Singh | G06T 11/206 345/440 |
| 2014/0380219 | A1 * | 12/2014 | Cartan | G06F 3/04842 715/771 |
| 2015/0026642 | A1 * | 1/2015 | Wilson | G06F 3/0482 715/825 |
| 2015/0046882 | A1 * | 2/2015 | Menyhart | G06F 3/0482 715/854 |
| 2015/0070357 | A1 * | 3/2015 | Tahan | G06F 3/14 345/428 |
| 2015/0143294 | A1 * | 5/2015 | Piccinato | G06F 3/0482 715/817 |
| 2015/0242106 | A1 * | 8/2015 | Penha | G06F 3/04847 715/854 |
| 2015/0324101 | A1 * | 11/2015 | Roesch | G06F 3/04847 715/771 |
| 2015/0346929 | A1 * | 12/2015 | Karunamuni | G06F 3/0483 715/777 |
| 2015/0378529 | A1 * | 12/2015 | Ramanathan | G06T 11/206 715/834 |
| 2016/0210001 | A1 * | 7/2016 | Antipa | G06F 3/0482 |
| 2016/0259517 | A1 * | 9/2016 | Butcher | G06F 3/0482 |

OTHER PUBLICATIONS ict.business.it—"Work via the mobile: it is now more solid with Oracle"; obtained at http://www.ictbusiness.it/cont/news/lavoro-via-mobile-ora-e-piu-solido-con-oracle/30917/1.html#. VS2DuPnF8qW; translated to English by Google translator; Jun. 3, 2013; 3 pages.

* cited by examiner

REFERENCE POSITION IN VIEWER FOR HIGHER HIERARCHICAL LEVEL

CROSS REFERENCES TO RELATED APPLICATIONS

This application claims priority from the following Provisional Patent Applications, each of which is hereby incorporated by reference as if set forth in full in this application for all purposes:

1. U.S. Provisional Patent Application Ser. No. 62/017,214, entitled METHODS FOR NAVIGATING HIERARCHICAL DATA ON MOBILE DEVICES, filed on Jun. 25, 2014; and 2. U.S. Provisional Patent Application Ser. No. 62/053,638, entitled PETAL ANIMATION FOR TRANSITIONS IN HIERARCHY VISUALIZATIONS, filed on Sep. 22, 2014.

This application is related to the following U.S. Patent Applications, each of which is hereby incorporated by reference as if set forth in full in this application for all purposes:

3. U.S. Pat. No. 9,939,991, entitled VISUALIZATIONS FOR NAVIGATING HIERARCHICAL DATA ON MOBILE DEVICES, issued on Apr. 10, 2018;

4. U.S. patent application Ser. No. 14/684,142, entitled ORBIT VISUALIZATION FOR DISPLAYING HIERARCHICAL DATA, filed on Apr. 10, 2015;

5. U.S. patent application Ser. No. 14/684,151, entitled ORBIT VISUALIZATION ANIMATION, filed on Apr. 10, 2015;

6. U.S. Pat. No. 10,175,855, entitled INTERACTION IN ORBIT VISUALIZATION, issued on Jan. 8, 2019;

7. U.S. Pat. No. 10,175,853, entitled CHAIN LAYOUT FOR DISPLAYING HIERARCHICAL DATA, issued on Jan. 8, 2019;

8. U.S. Pat. No. 10,175,854, entitled INTERACTION ORBIT VISUALIZATION, issued on Jan. 8, 2019, each of which are hereby incorporated by reference, as if set forth in full in this specification.

9. U.S. Pat. No. 9,021,397, entitled VISUALIZATION AND INTERACTION WITH FINANCIAL DATA USING SUNBURST VISUALIZATION, issued on Apr. 28, 2015;

10. U.S. Pat. No. 9,495,777, entitled VISUAL DATA ANALYSIS FOR LARGE DATASETS, issued on Nov. 15, 2016;

BACKGROUND

The present application relates to software and more specifically to user interface designs and methods for graphically displaying and interacting with data or associated computing objects.

Software and accompanying methods for facilitating information visualization are employed in various demanding applications, including enterprise resource planning, scientific research, digital libraries, data mining, financial data analysis, market studies, manufacturing production control, drug discovery, and so on. Such applications often demand space-efficient illustrative visualizations for clearly illustrating data and accompanying characteristics, patterns, and interrelationships, while preserving context as the user navigates and views the visualizations.

Illustrative visualizations with features for efficiently preserving context during navigation of the visualizations can be particularly important for mobile enterprise applications, where navigation of large datasets using small mobile device displays can result in lost context, whereby a user forgets or loses track of which part of the overall visualization is currently being displayed after a particular navigation action, e.g., navigation downward in a hierarchy.

Conventional visualizations, such as tree structures, often lack effective mechanisms or features for facilitating preservation of context during navigation. Panning, zooming, scrolling, or jumping to particular nodes, often results in loss of context, especially when using relatively small mobile device displays.

SUMMARY

An example method for facilitating preservation of context information during navigation of a visualization includes representing hierarchical data via a visualization, wherein the visualization includes one or more hierarchically related nodes, wherein the one or more hierarchically related nodes are associated with one or more respective computing objects, and wherein the visualization includes a parent node surrounded by one or more child nodes, wherein the one or more child nodes are confined to a path that at least partially circumscribes the parent node, and wherein the parent node is a central node of the visualization; providing a first user option to navigate to a child node selected from among the one or more child nodes; and updating the displayed visualization in response to user selection of the first user option, resulting in an updated visualization, wherein the updated visualization includes the parent node positioned at a periphery of the visualization, and wherein the selected child node is positioned as a new central node of the updated visualization.

In a more specific embodiment, the example method further includes displaying one or more grandchild nodes of the parent node about a second path of the updated visualization. The second path at least partially circumscribes the selected child node. A second user option enables a user to trigger movement of the one or more grandchild nodes along the second path. A third user option enables a user to move the parent node along the first path.

The specific example method further includes enabling both user selection of the first user option in combination with user selection of the child node, via a touch gesture applied to the selected child node. The touch gesture may be a two-finger separation gesture applied to a region of a user interface display screen coinciding with the displayed selected child node.

The specific example method further includes accessing information characterizing one or more display characteristics of a computing device used to display the visualization and the updated visualization. The one or more display characteristics include an indicator of a size of a display of the computing device. The information is then employed to determine a number of hierarchical levels of the visualization (called an orbit visualization) to display via a user interface display screen of a computing device.

The computing device may be a mobile computing device, and the number of hierarchical levels may be limited to three in the specific example embodiment. The three levels or portions thereof may be displayed during navigation upward or downward in the hierarchy represented via the orbit visualization.

In an illustrative embodiment, an example method includes accessing hierarchically related data that is arranged in one or more computing objects; representing a portion of the hierarchically related data via an orbit visualization; and displaying a first carousel control concurrently with the orbit visualization, wherein the first carousel control includes one or more user options to navigate to a previously navigated-to node of the visualization.

Hence, certain embodiments discussed herein facilitate providing efficient mechanisms for enabling users to readily ascertain how a given displayed portion of a visualization (e.g., a central node) relates to higher levels in the underlying data hierarchy while simultaneously providing user options to efficiently navigate to higher levels or lower levels while maintaining navigation context.

A further understanding of the nature and the advantages of particular embodiments disclosed herein may be realized by reference of the remaining portions of the specification and the attached drawings.

DETAILED DESCRIPTION OF EMBODIMENTS

Figure 1:
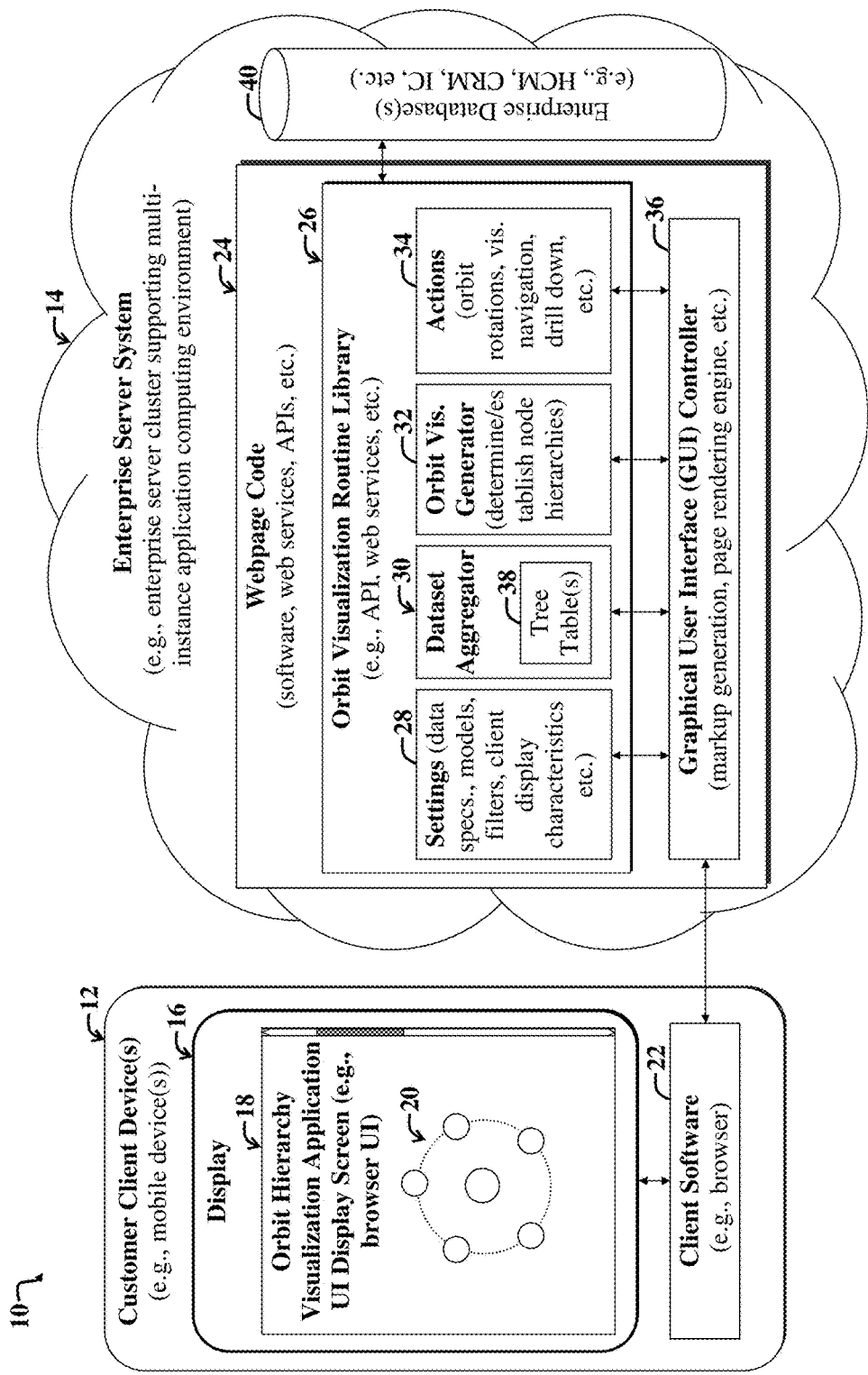
FIG. 1 is a diagram illustrating an example enterprise computing environment and accompanying system for facilitating generating and displaying hierarchical data via orbit visualizations.

For the purposes of the present discussion, information visualization may be any process involving graphically representing data according to a method or scheme. A graphical representation of data resulting from an information visualization technique is called a visualization. Example visualizations include pie charts, treemaps, bar charts, line graphs, N-boxes, maps with data layers, and so on.

An object, such as a data object, may be any grouping of or encapsulation of data and/or functionality. Examples of objects include classes or structures implemented via object-oriented programming languages; tables, rows, columns, fields, or records, of a database; and so on. An object may include a single item or instance of data, such as a number or other descriptor or attribute, or the object may include plural instances of data and/or functionality (e.g., software methods, such as functions or function calls) and may further include sub-objects.

A representation of an object, i.e., a displayed object, may be displayed via a graphical depiction, such as a node of a visualization, a menu item, dialog box, personnel icon, and so on. The graphical depiction of an object may also be called an object, a displayed object, or a node.

The terms "object," "data object," and "computing object" are employed interchangeably herein and may include functionality and/or data. Examples of computing objects include a note, appointment, a particular interaction, a task description, and so on. Examples of data that may be included in an object include text of a note (e.g., a description); subject, participants, time, and date, and so on, of an appointment; type, description, customer name, and so on, of an interaction; subject, due date, opportunity name associated with a task, and so on. An example of functionality that may be associated with or included in an object include issuing a reminder for an appointment, submitting an expense report for approval, approving of an expense report, and so on.

Generally, a node may be any graphical representation of an object in a visualization. Note that certain nodes may include sub-nodes, just as an object may include or represent additional objects, i.e., sub-objects.

For the purposes of the present discussion, a data attribute (also simply called attribute herein) may be any value or property characterizing data. Accordingly, an attribute of a visualization, node, or associated data, may refer to any characteristic of data used to generate a visualization or any characteristic of a visualization representing a characteristic of the data. The data characteristic and/or visualization characteristic may be employed to group or otherwise organize or visually distinguish the data by adjusting features or characteristics of the visualization. Examples of attributes include data dimensions or layers, such as specified by row or column headers of tables used to store the data used for a visualization.

Hence, a node attribute may be any characteristic of a node or any information associated with the node. A node attribute may include a characteristic of underlying data and/or may include a visual attribute.

A visual attribute may be associated with or mapped to an underlying node attribute. For example, a node representing a female employee may include a particular shape (visual attribute) that is associated with the underlying data (e.g., data attribute) indicating that node represents a female.

For the purposes of the present discussion, an enterprise may be any organization of persons, such as a business, university, government, military, and so on. The terms "organization" and "enterprise" are employed interchangeably herein. Personnel of an organization, i.e., enterprise personnel, may include any persons associated with the organization, such as employees, contractors, board members, customer contacts, and so on.

Enterprise software, such as Enterprise Resource Planning (ERP) software, may be any set of computer code that is used by an enterprise or organization. Examples of enterprise software classifications include HCM (Human Capital Management) software, CRM (Customer Relationship Management) software; BI (Business Intelligence) software, and so on. Examples of ERP software applications include Financials, Assets, Procurement, Projects, Supply Chain, and so on. The terms "ERP software" and "ERP application" may be employed interchangeably herein.

Enterprise software applications, such as Customer Relationship Management (CRM), Business Intelligence (BI), and project management software, often include databases with various database objects, also called data objects or entities. For the purposes of the present discussion, a database object may be any computing object maintained by a database. A computing object may be any collection of data and/or functionality. Examples of computing objects include an employee record, a product record, and so on. Examples of data that may be included in an object include employee name and address information, job role, performance ratings, project or task information, appointment records, and so on. An example of functionality that may be associated with or included in an object includes software functions or processes for issuing a reminder for an appointment.

In various embodiments discussed herein, to facilitate conveying information, visual properties of a node can be varied in accordance with a data attribute (also simply called attribute herein) characterizing the underlying object, i.e., data, thereby visually encoding the attribute.

Enterprise data may be any information pertaining to an organization or business, including information about customers, appointments, meetings, opportunities, customer interactions, projects, tasks, resources, orders, enterprise personnel, and so on. Examples of enterprise data include work-related notes, appointment data, customer contact information, descriptions of work orders, asset descriptions, photographs, contact information, calendar information, enterprise hierarchy information (e.g., corporate organizational chart information), and so on.

For the purposes of the present discussion, multi-dimensional data may be any data that can be partitioned by interrelated groupings or categories. A data dimension, often simply called "dimension," may be any category, such as an amount category, used to group or categorize data.

A data level may be any categorization of data of a given dimension. For example, data that includes a location dimension may include different data levels associated with state, county, city, and so on. Such data levels may represent an extrinsic sub-hierarchy of an implicit hierarchy that includes the location dimension. In general, extrinsic hierarchies include various data levels, while intrinsic hierarchies may include several dimensions that may include different data levels.

Enterprise data is often characterized by a hierarchy. For the purposes of the present discussion, a hierarchy may be any arrangement of items, e.g., data objects, names, values, categories, and so on. The items may be ordered or positioned such that they exhibit superior or subordinate relationships with related items in a data set. A hierarchy may refer to a displayed representation of data items or may refer to data and accompanying relationships existing irrespective of the representation.

Data hierarchies may be categorized as explicit and/or implicit hierarchies. Explicit hierarchical representations of data are organized according to hierarchical relationships inherent within the data. Such hierarchical relationships are often based on persistent data attributes characterizing the data. An example of an explicit hierarchy includes information about cities arranged by country, state, county, and so on. Another example may be a human resources hierarchy, which depicts a corporate structure, where employees are subordinate to project managers, which are subordinate to regional directors, and so on. In general, explicit hierarchies are defined and maintained irrespective of the visualization technique used to display the data.

For the purposes of the present discussion, an implicit hierarchical representation, i.e., implicit hierarchy, may refer to an organization of data and relationships that is user instantiated by choices made to display and/or analyze the data. Hence, certain implicit hierarchies may be implied from the way that users classify and summarize detailed amounts or metrics by different data dimensions on reports and analytics. Each level of an implicit hierarchy may correspond to a data dimension displayed in a report or analytic. A data dimension may be any category or classification of an amount or category. For example, columns of a table may represent data dimensions.

In certain embodiments discussed herein, trees (also called tree structures herein) that define a hierarchical structure characterizing data can be created by a human user such as an administrator. Underlying trees may be employed by software to construct orbit visualizations, as discussed more fully below.

Different utilities may be provided, such as TreeManager® in the PeopleSoft® suite of software products, which can allow a user to define trees or other hierarchies. Once defined, the tree can be applied to data to allow viewing of the data in accordance with the tree hierarchy. For example, spending accounts for each department in a large company can be organized via an orbit visualization according to the tree structure of the departments within the organization.

In general, hierarchical relationships characterizing hierarchical data may be "immediate", i.e. where the hierarchical levels of two data objects differ by one (1). In such a case, the data object with the higher hierarchical level may be called the "parent" or "immediate ancestor" or "inferior object" and the data object with the lower hierarchical level may be called the "child," or "immediate descendant," the "inferior object," "subordinate object." Depending upon the context, in an orbit visualization, a node representing a child object of a parent object is called a planet of a node representing the parent object.

Hierarchical relations may be "remote", i.e. where the hierarchical levels of two data objects differ by two (2) or more. In such a case, the data object (or corresponding node) with the higher hierarchical level may be called the "remote ancestor" (such as a "grandparent") and the data object (or associated node) characterized by the lower hierarchical level may be called the "remote descendant" (such as a "grandchild"). Data objects or nodes on the same hierarchical level may be called "hierarchical peers" or "siblings."

For clarity, certain well-known components, such as hard drives, processors, operating systems, power supplies, Internet Service Providers (ISPs), class loaders, bytecode compliers, middleware, and so on, are not necessarily explicitly called out in the figures. However, those skilled in the art with access to the present teachings will know which components to implement and how to implement them to meet the needs of a given implementation.

FIG. 1 is a diagram illustrating an example enterprise computing environment and accompanying system 10 for facilitating generating and displaying hierarchical data via one or more orbit visualizations 20.

Note that, in general, groupings of various modules of the system 10 are illustrative and may vary, e.g., certain modules may be combined with other modules or implemented inside of other modules, or the modules may otherwise be distributed differently (than shown) among a network or within one or more computing devices, without departing from the scope of the present teachings. For example, a system for generating orbit visualizations given a data set may be implemented entirely client-side, e.g., on a mobile device 12, without departing from the scope of the present teachings.

The example system 10 includes the mobile device 12, also called the client device (or simply client) herein, in communication with an enterprise server system 14, which comprises or more servers in communication with the mobile device 12 via a network, such as the Internet.

For the purposes of the present discussion, mobile computing device may be any computer that is adapted for portable use. In general, a computing device may be any computer. A computer may be any processor coupled to memory. Examples of mobile computing devices include laptops, notebook computers, smartphones and tablets (e.g., iPhone, iPad, Galaxy Tab, Windows Mobile smartphones, Windows 7 smartphones and tablets, Android smartphones tablets, Blackberry smartphones, and so on), and so on. Various specific example embodiments discussed herein may employ a mobile computing device further equipped with various features, such as a camera, a network connection, Global Positioning System (GPS) receiver, gyroscope, compass, and user input functionality, such as a touch screen and/or or qwerty keypad. The terms "mobile device" and "mobile computing device" are employed interchangeably herein.

A server may be any computing resource, such as a computer and/or software that is adapted to provide content, e.g., data and/or functionality, to another computing resource or entity that requests it, i.e., the client. A client may be any computer or system that is adapted to receive content from another computer or system, called a server. A server system may be any collection of one or more servers and accompanying computing resources.

The example mobile device 12 includes a touch screen 16 displaying a browser User Interface (UI) display screen, which includes an orbit hierarchy visualization UI display screen 18, which illustrates an example orbit visualization 20.

For the purposes of the present discussion, a UI display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view or window. Views or windows may include sections, such as sub-views or sub-windows, dialog boxes, graphs, tables, and so on. In certain cases, a UI display screen may refer to all application windows presently displayed on a display.

An orbit visualization may be any visualization or graphical representation of data and/or concepts that represents hierarchical relationships between nodes, at least in part by distributing or positioning one or more subordinate nodes (also called child nodes) about a superior node, where the superior node is a parent node of the one or more subordinate nodes, and where the positions of the one or more subordinate nodes are confined to a path or boundary that at least partially circumscribes the parent node. The terms "orbit hierarchy visualization," "orbit hierarchy," and "orbit visualization" are employed interchangeably herein.

Client-side software 22 may include a browser and associated Graphical User Interface (GUI) software adapted to facilitate browsing content provided by the enterprise server system 14, including applications implemented via webpage code 24. The client-side software 22 includes computer instructions for facilitating rendering hierarchical data, i.e., any data characterized by objects or other elements of data and/or functionality which exhibit one or more hierarchical relationships relative to other objects. The hierarchical data may be retrieved from a backend database 40 of the enterprise server system 14.

The example webpage code 24 includes an orbit visualization routine library 26, which may be implemented via one or more Application Programming Interfaces (APIs), web services, and/or other mechanisms. The routine library 26 includes various modules 28-34, which are adapted to facilitate implementing software functionality used to generate rendering instructions for the orbit visualization 20 and for facilitating providing UI controls and other mechanisms for enabling user interaction with the orbit visualization 20, e.g., enabling navigating a hierarchy of underlying data used to generate the orbit visualization; enabling drilling down into data of data object represented by a node of the orbit visualization 20, and so on, as discussed more fully below.

For the purposes of the present discussion, software functionality may be any function, capability, or feature, e.g., stored or arranged data, that is provided via computer code, i.e., software. Generally, software functionality may be accessible via use of a UI and accompanying UI controls and features. Software functionality may include actions, such as retrieving data pertaining to a computing object (e.g., business object); performing an enterprise-related task, such as promoting, hiring, and firing enterprise personnel, placing orders, calculating analytics, launching certain dialog boxes, performing searches, and so on.

A UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, wherein the input affects a UI display screen and/or accompanying software application associated with the software.

For the purposes of the present discussion, navigation may refer to a transition of a UI display screen from a first display of one or more objects to a second display of one or more objects in response to user selection of an object or control in the first display of one or more objects.

A user is said to navigate data or to navigate a menu if the user selects one or more different displayed objects or items (e.g., navigation link) to activate other objects or items to be displayed. A navigation link may be any UI control adapted to trigger navigation to a node represented by the navigation link. User selection of a navigation link results in display of a navigated-to location. The updating of a UI display screen and/or associated displayed visualization in response to user selection of a navigation link represents implementation of a navigation step.

A navigated-to node may be any node that is prominently displayed in a UI display screen, such that further navigation is not required to view a representation of the node. In certain embodiments discussed herein, navigated-to nodes are illustrated as central nodes of an orbit visualization.

When navigating a hierarchy visualization, a user is said to implement downward navigation if the user navigates to one or more lower levels of the hierarchy, e.g., by navigating to a child node of a parent node. Similarly, upward navigation involves navigation to one or more higher levels of a hierarchy, e.g., by navigating to a parent node of a child node. In various embodiments discussed herein, the navigated-to node becomes the centrally displayed node, i.e., the node that is most prominently featured, e.g., positioned closest to a center or centroid of the associated orbit visualization.

A representation of an object, i.e., a displayed object, may be displayed via graphical depiction, such as a menu item, dialog box, icon, and so on. The graphical depiction of an object may also be called an object, a displayed object, or a node. Data (or corresponding data object) is said to underlie a node of a visualization if the node is used to navigate the data or to otherwise access the data and/or associated functionality.

For the purposes of the present discussion, in an orbit visualization, a central node may be any node that is displayed closest to a center or centroid of a visualization. In general, the central node represents an example of a navigated-to node, which is part of a navigated-to location of a UI framework characterizing a UI of software used to display orbit visualizations.

Various modules 28-34 of the orbit visualization routine library 26 may communicate with the backend database 40 to facilitate selective retrieval of (and/or access to) data and associated data objects for use in generating rendering instructions for displaying orbit visualizations 20 and accompanying nodes, which represent underlying data objects.

The server-side webpage code 24 further includes a GUI controller 36, which is adapted to selectively communicate with one or more modules 28-34 of the orbit visualization routine library 26 and the client-side software 22. The GUI controller 36 may further act as an interfacing mechanism for enabling various modules 28-34 of the orbit visualization routine library 26 to intercommunicate.

Additional computer instructions, i.e., computer code, of the GUI controller 36 are adapted to selectively call functionality provided by one or more of the modules 28-34 as needed to enable data retrieval and implementation of updates to the orbit visualization 20 in response to user interaction therewith.

User interaction with the orbit visualization 20 may include, but is not limited to navigating upward and downward in the hierarchy represented by the orbit visualization 20, implementing drill-down software actions for user-selected nodes, rotating nodes about a path (i.e., orbit path) that circumscribes a parent node, triggering display of actions menus, informative hover layers, and so on, as discussed more fully below.

The example modules 28-34 of the orbit visualization routine library 26 include a settings module 28, a dataset aggregator 30, an orbit visualization generator 32, and an actions module 34.

The settings module 28 is adapted to provide software functionality for enabling users to specify various settings to characterize the orbit visualization 20. Example settings include specifications of the number of hierarchical levels to display at a given time via the orbit visualization 20 of the client-side orbit hierarchy UI display screen 18; which data sets to visualize via the orbit visualization 20, and so on.

In the present example embodiment, certain settings, e.g., settings specifying the number of hierarchical levels to display, may be determined automatically. Automatic determination of such settings may be implemented by computer code running on the settings module 28. The settings module 28 is adapted to communicate with the client device 12 and accompanying software 22 to determine display characteristics, e.g., display size and resolution, device type, processor and memory specifications, and so on.

In general, larger or higher resolution displays may support display of additional hierarchical levels in the orbit visualization 20 at a given time. The exact number of hierarchical levels to display is implementation specific and may vary, without departing from the scope of the present teachings. Furthermore, various settings may be manually and/or automatically, without departing from the scope of the present teachings.

In general, the settings module 28 may include display characteristics detection software code for facilitating detecting display size, resolution, available client-side native plugins, graphics processing resources, and so on. Additional functionality of the display characteristics detection software code may include functionality for detecting a characteristic of a data object represented via a node of the visualization, and then visually encoding the characteristic via the node. Additional functionality may include detecting one or more permissions associated with a user logged into software used to display the visualization, and adjusting one or more available user options based on the one or more permissions. Additional functionality may be implemented via mechanisms for adjusting visual encoding of information via one or more nodes of the visualization in accordance with the one or more permissions.

For the purposes of the present discussion, visual encoding (also simply called encoding or coding herein) of a data attribute may be any process involving representing the data attribute graphically. For example, if a hierarchical position of a node in an enterprise organizational chart is used to adjust a size, shape, color, or position, etc., of the node in a visualization, then the hierarchical position is said to be visually encoded via the node size, shape, color, or position, respectively.

An attribute of a visualization, node, or associated data, may be any characteristic of data used to generate a visualization, where the characteristic may be employed to group or otherwise organize or visually distinguish the data by adjusting features or characteristics of the visualization. Examples of attributes include data dimensions or layers, such as specified by table headers of tables 38 used to store the data used for a visualization.

The dataset aggregator 30 is adapted to selectively retrieve data (e.g., via Structured Query Language statements, web services, and/or other mechanisms) from the backend database 40, e.g., with reference to the settings 28 and any associated data models specified for use in displaying the orbit visualization 20. Retrieved data may be stored in a cache of the dataset aggregator 30, or alternatively, may be maintained at the database 40 and then only retrieved when needed to facilitate generation of the orbit visualization 20.

Hierarchical relationships inherent in data retrieved by the dataset aggregator 30 may be stored as tree tables 38 or pivot grids. Hierarchical relationships represented by the tree tables 38 may be user-specified and may be adjusted, or alternatively, the relationships are predetermined. Predetermined relationships may include, for example, hierarchical relationships characterizing enterprise personnel, as may be conventionally represented via a tree structure representing an organizational chart.

In the present example embodiment, the displayed orbit visualization 20 represents a hierarchy visualization, whose hierarchical relationships may conventionally characterized by a tree structure.

For the purposes of the present discussion, a hierarchy visualization may be any visualization that is adapted to illustrate a hierarchy or hierarchal relationship between data or data objects. As set forth above, a hierarchy may be any ordering of or arrangement of data, where different data in the arrangement may exhibit superior or subordinate relationships with other data.

A hierarchy may refer to a displayed representation of data objects or may refer to data and accompanying relationships existing irrespective of the representation. For example, an enterprise hierarchy, e.g., which may be displayed via an organizational chart (also called org chart) may be any power structure, position structure, or reporting structure characterizing an enterprise.

The orbit visualization generator module 32 includes computer code for generating rendering instructions for rendering the orbit hierarchy visualization application UI display screen 18, including the accompanying orbit visualization 20. The orbit visualization generator module 32 may reference information and/or instructions provided by other modules 28, 30, 34 of the orbit visualization routine library 26 to facilitate generation of the rendering instructions. The rendering instructions may then be processed by the GUI controller 36 and forwarded to the client software 22 for facilitating rendering and display of the orbit hierarchy visualization application UI display screen 18.

The actions module 34 is adapted to facilitate implementation of software actions associated with various UI controls of the displayed orbit hierarchy visualization application UI display screen 18. Note that in general, a visualization may be coupled to or may otherwise include one or more UI controls, which are associated with software functionality, whereby user selection of the UI control triggers execution of a software action.

For the purposes of the present discussion, a software action may be any process or collection of processes or operations implemented via software. Additional examples of processes include updating or editing data in a database, placing a product order, creating an opportunity business object, creating a business contact object, adding a revenue line to a business object, displaying data visualizations or analytics, triggering a sequence of processes, launching an enterprise software application, displaying a dialog box with details and functionality associated with a particular node (e.g., implementing a drill-down), spinning or moving planet nodes about an orbit path around a parent node, and so on.

In various example embodiments discussed herein, the client-side display 16 represents a touch screen. Various UI controls and associated mechanisms are responsive to touch gestures as input.

For the purposes of the present discussion, touch gesture may be any input provided to a touch-sensitive display, i.e., touch screen, by touching the display. A display may be touched with one or more fingers and/or other objects or devices, such as a stylus.

A multi-touch gesture, such as a two-finger swipe, two-finger separation gesture, two-finger pinch gesture, and so on, may be any gesture that involves contacting a touch-sensitive display simultaneously at different positions on the display.

A gesture may include motion across a display or a tap at a predetermined position or any position of the display. Certain touch gestures may include touching the display and moving fingers or other devices in certain patterns across the display or across certain portions of the display to trigger different UI input signals to control the UI display screens and accompanying applications.

Figure 2:
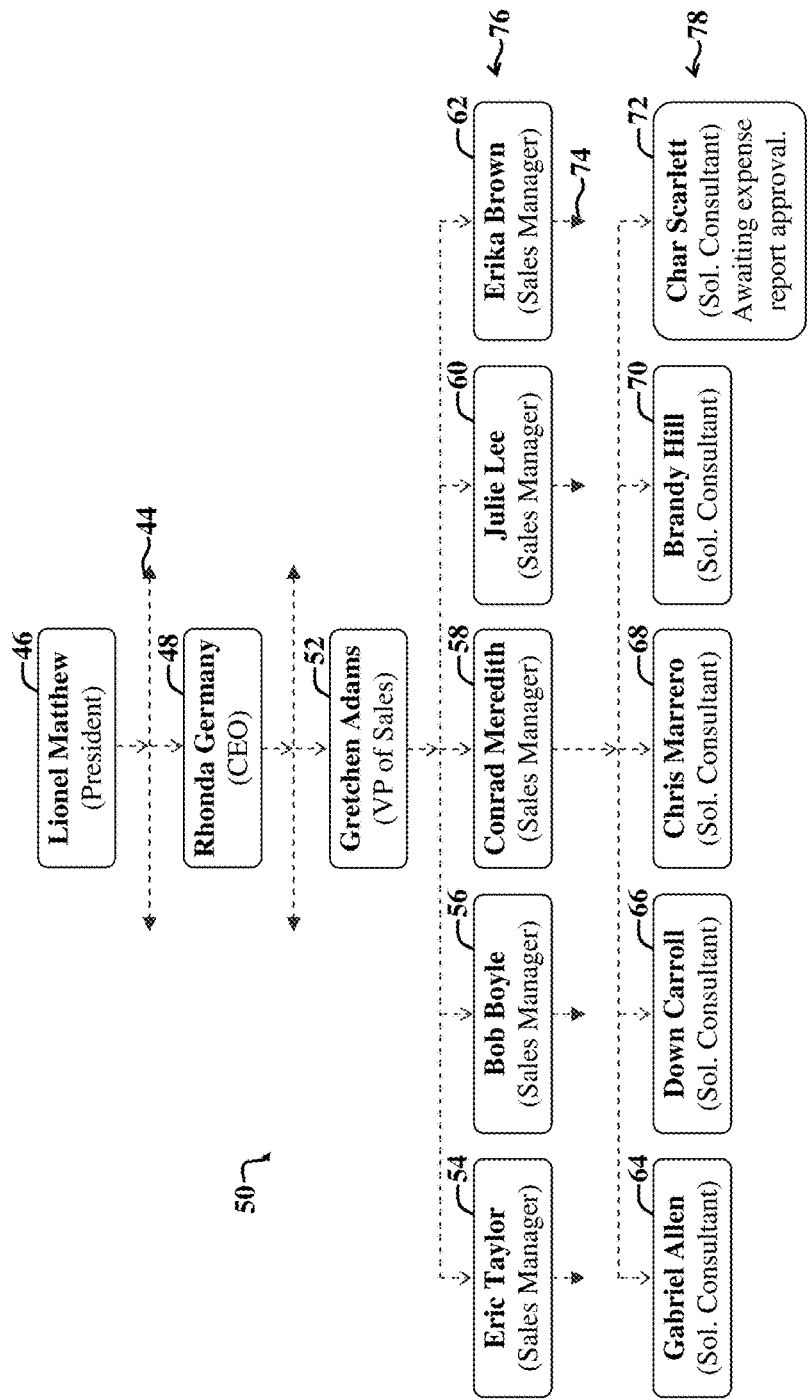
FIG. 2 shows an example tree diagram depicting hierarchical relationships between example data objects, the relationships of which are leveraged by the data aggregator of the system of FIG. 1 to generate orbit visualizations.

FIG. 2 shows an example tree diagram 50 depicting hierarchical relationships (also simply called the hierarchy) between example data objects 46-72. The hierarchical relationships are leveraged by the data aggregator 30 of the system 10 of FIG. 1 to generate orbit visualizations, e.g., the orbit visualization 20 of FIG. 1. The example tree diagram 50 may represent hierarchical relationships of the tree tables 38 of the data aggregator 30.

Note that conventionally, the hierarchical relationships illustrated by the tree diagram 50 may be displayed on a UI display screen as a tree diagram. However, tree diagrams may be relatively cumbersome to use and navigate, especially when used to represent large datasets on relatively small mobile device displays, as conventional panning, zooming, scrolling, and so on, may result in loss of context as the user interacts with the data represented via the tree diagram.

The following discussion of the tree diagram 50 is adapted to facilitate an understanding of various embodiments and associated orbit visualizations, discussed more fully below. The example tree diagram 50 illustrates, at a highest level of the associated hierarchy, a top object 46 (also called a top tier object or a first tier object). A second tier object 48 represents a child object of the top tier object 46. Similarly, a third tier object 52 represents a child object of the second tier object 48.

Example horizontal lines with arrows (e.g., the line with arrowheads 44) indicate that additional sibling objects of an object (e.g., a "Rhonda Germany" object 48) below the line 44 may exist. Similarly, vertical lines with arrowheads (e.g., the line 74) indicate that the associated object is further associated with additional child objects.

The third tier object 52 includes various child objects 54-62 at a fourth level (i.e., fourth tier 76) down in the hierarchy 50. An example fourth tier object 58 represents a parent object of its child objects 64-72, which represent fifth tier objects 78. The fifth tier objects 64-72 represent descendant objects of the top tier object 46.

When a user navigates the hierarchy 50 to view lower level objects, the user is said to be navigating downward in the hierarchy. Similarly, if a use navigates a UI display screen to view data of a first child object 54; then to view data of a second child object 56, etc., the user is said to be navigating horizontally in the hierarchy 50.

Figure 3:
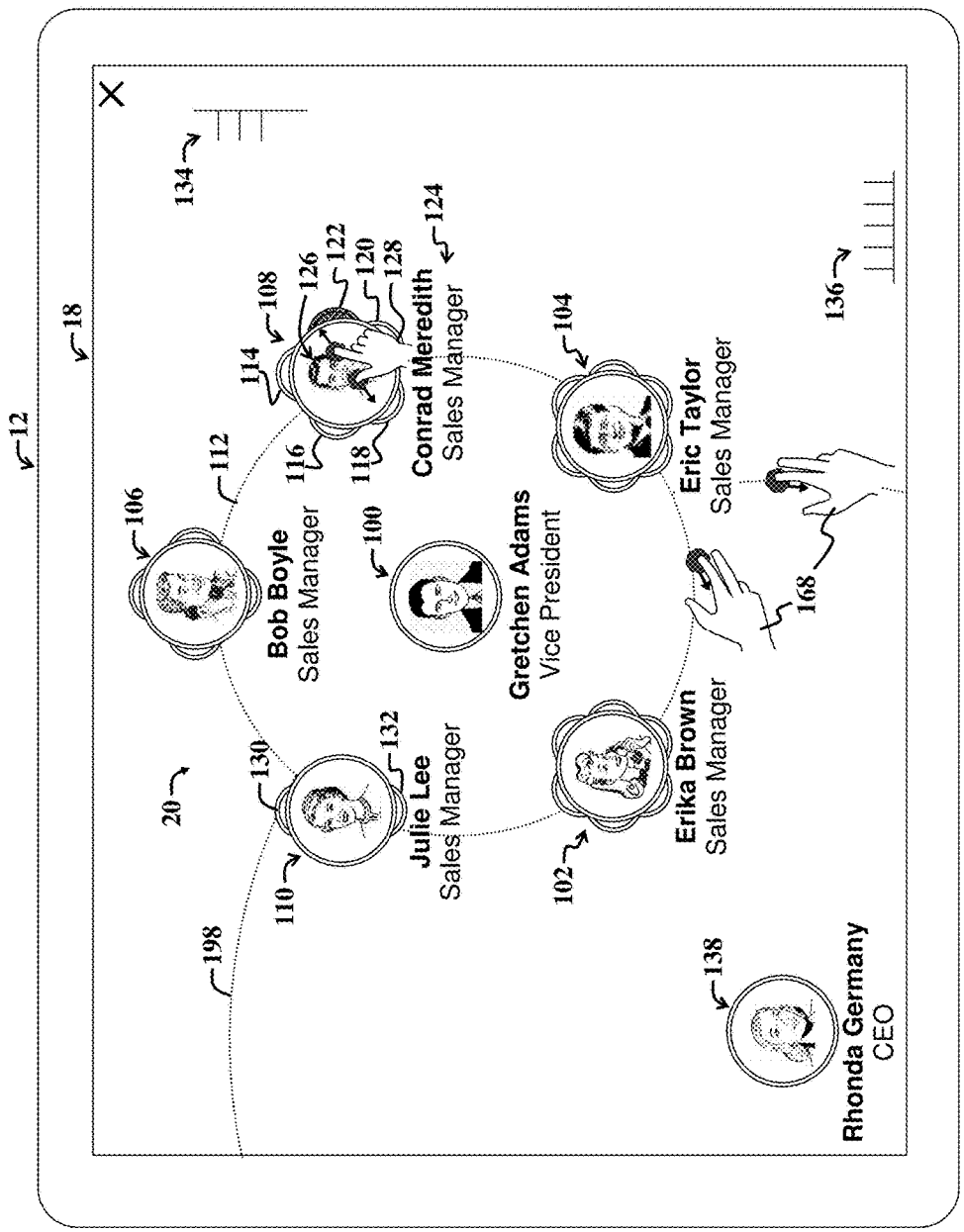
FIG. 3 shows a first example user interface display screen and accompanying orbit visualization reflecting example hierarchical relationships between visualization nodes, where the nodes represent underlying data objects.

FIG. 3 shows a first example UI display screen 18 (which may be implemented via the mobile device display 16 of FIG. 1 or other mechanism, e.g., desktop display) and accompanying orbit visualization 20. The orbit visualization 20 reflects example hierarchical relationships between visualization nodes 100-110, where the nodes 100-110 represent underlying data objects.

With reference to FIGS. 1 and 3, in the present example embodiment, a user has employed the mobile device 12 to browse to a website exhibiting the webpage code 24. The user then logs into the software 24 by providing credentials, e.g., username and password, which are associated with predetermined user access permissions of the user.

A user then interacts with the webpage code 24 via the UI display screen 18 to select an orbit visualization mode. Additional UI controls may facilitate user navigation of the overall orbit hierarchy visualization application UI display screen 18.

The webpage code 24 is activated to retrieve data objects and associated interrelationships as depicted in the tree diagram of FIG. 2, and further illustrated via the orbit visualization 20 of FIG. 3. In the present example embodiment, a central node 100 representing a data object containing information associated with a "Gretchen Adams" enterprise employee is initially shown as the central node 100 of the orbit visualization 20.

Note that initial displays of orbit visualizations as discussed herein may vary, e.g., depending upon visualization settings, data models used, and so on, without departing from the scope of the present teachings.

With reference to FIGS. 2 and 3, the highest level object 46 of FIG. 2 is not represented by a node currently shown in the visualization 20, which is limited to showing only three hierarchy levels of nodes (e.g., a Rhonda Germany node 138 level, a Gretchen Adams node 100 level, and a level associated with child nodes 102-110) in the present example embodiment. Nevertheless, a higher level node 138, called the "Rhonda Germany" node 138 is shown and corresponds to the second tier object 48 illustrated in FIG. 2. The Rhonda Germany node 138 is a parent node of the central Gretchen Adams node 100 and is located at a reference position at a periphery or corner of the orbit visualization 20. Child nodes 102-110 of the parent Gretchen Adams node 100 correspond to the child objects 54-62 of the third tier object 52 of FIG. 2.

A "Conrad Meredith" node 108 is shown including various petals 114-122. The petals 114-122 correspond to or represent the fifth tier objects 64-72 of FIG. 2. Note that the fifth petal 122 is visually encoded to draw the attention of the logged in user. In the present example embodiment, the fifth petal 122 corresponds to the data object 72 of FIG. 2, and the visual encoding further indicates that an employee associated with the data object 72 is awaiting approval of an expense report (e.g., as shown in FIG. 2).

For the purposes of the present discussion, a petal may be any displayed node or portion thereof that represents a data object, wherein a portion of the node overlaps or is obscured (or appears to overlap or be obscured) by a portion of a parent node about which the petal is positioned.

Note that in certain implementations, petals of a given node may be selectively distributed in different ways as a way to visually encode information. For example, in implementations displaying large nodes with several petals, different petals may be clustered about an outer edge of the large node in accordance with a predetermined grouping criteria, e.g., as may be established by configuring settings. User options for adjusting settings may be accessible via one or more of additional UI controls, e.g., as may be available through a menu activatable via a predetermined touch gesture.

The Gretchen Adams node 100 is movably confined to a first orbit path 198. Similarly, various planets, i.e., child nodes 102-110 of the orbit visualization 20 are movably confined to a second orbit path 112 that circumscribes, i.e., surrounds, the central parent node 100. User options for rotating, spinning, or otherwise repositioning the child nodes 102-110 and/or the Gretchen Adams node 100 may be provided, e.g., by enabling a swipe gesture to trigger movement or orbiting of the child nodes 102-110 about the central node 100 or movement of the Gretchen Adams node 100 about the Rhonda Germany node 138.

The child nodes 102-110 are also called satellite nodes or planets, which when moved about the orbit path 112 are said to orbit the central node 100. The example nodes 100-110 may include various indicia, e.g., indicia 124, indicating a name and title of an enterprise employee associated with a given node, which is in turn associated with an underlying data object.

Each planet (also called planet node) 102-110 may include petals indicative of and/or corresponding to direct reports, i.e., child nodes of the planet. For example, a "Julie Lee" node 110 includes two direct reports associated with petals 130, 132.

For the purposes of the present discussion, a planet may be any node of an orbit visualization that is at least approximately confined to an orbit path or position on an orbit path or boundary. The terms "planet," "planet node," "satellite," "satellite node" are employed interchangeably herein. Petals may represent a particular type of planet, which may be actuated and separated from the boundary of a parent node, e.g., via a two-finger separation gesture 128.

The UI display screen 18 further includes a vertical carousel control 134. The carousel control 134 is configured to indicate a level or navigation location currently being shown by the orbit visualization 20. For example, the carousel control 134 includes three horizontal bars indicating that the currently displayed navigation level corresponds to a third tier view (e.g., third tier object 52 of FIG. 2), which illustrates the third tier Gretchen Adams node 100 as a central node. Alternatively, or in addition, the carousel control 134 features indicate a number of navigation steps that the logged in user has navigated to, where each navigation step may represent or correspond to a navigation breadcrumb, as discussed more fully below.

The carousel control 134 is adapted to provide additional navigation functionality and navigation reference features. For example, a tap and hold gesture applied to the carousel control 134 may activate a user selectable list indicating different navigation locations to which a user may transition the orbit visualization 20. Example operation of a carousel control is discussed more fully below with reference to FIG. 5.

For the purposes of the present discussion a carousel control may be any mechanism, e.g., UI control and/or widget, that may be scrolled to view elements or links that may be navigated to. A breadcrumb may be any mechanism for marking a history of navigation steps during navigation of a graphical UI of a software application.

For the purposes of the present discussion, a linked breadcrumb may be any user selectable mechanism for indicating a previously visited menu item, UI display screen, or other navigation location, e.g., database object, folder, file, dialog box, and so on, and enabling triggering of subsequent navigation thereto. In the present specific embodiment, a particular displayed representation of a breadcrumb (also simply called a breadcrumb) may act as a hyperlink upon user selection thereof, where the hyperlink triggers display of a UI display screen representative of the name of the breadcrumb.

Hence, the term "breadcrumb" may include data characterizing a UI display screen associated with or indicated via the breadcrumb and/or the displayed representation of the UI control characterizing the breadcrumb, and/or functionality associated with the UI control.

In general, a breadcrumb trail represented in a list that is activatable via the carousel control 134 may indicate a current navigation location and provide mechanisms enabling users to transition to display of previously visited navigation locations, i.e., UI display screens. A carousel control list may be any UI feature that visually indicates one or more breadcrumbs and/or representations of one or more breadcrumbs.

Similarly, a horizontal carousel control 136 provides features for facilitating horizontal navigation to different siblings of the central node 100. The example horizontal carousel control 136 includes five vertical bars corresponding to five siblings of the central Gretchen Adams node 100.

A tap and hold gesture applied to the horizontal slider may activate a menu or list with breadcrumbs or other links to facilitate horizontal navigation to sibling nodes of Gretchen Adams.

Figure 4:
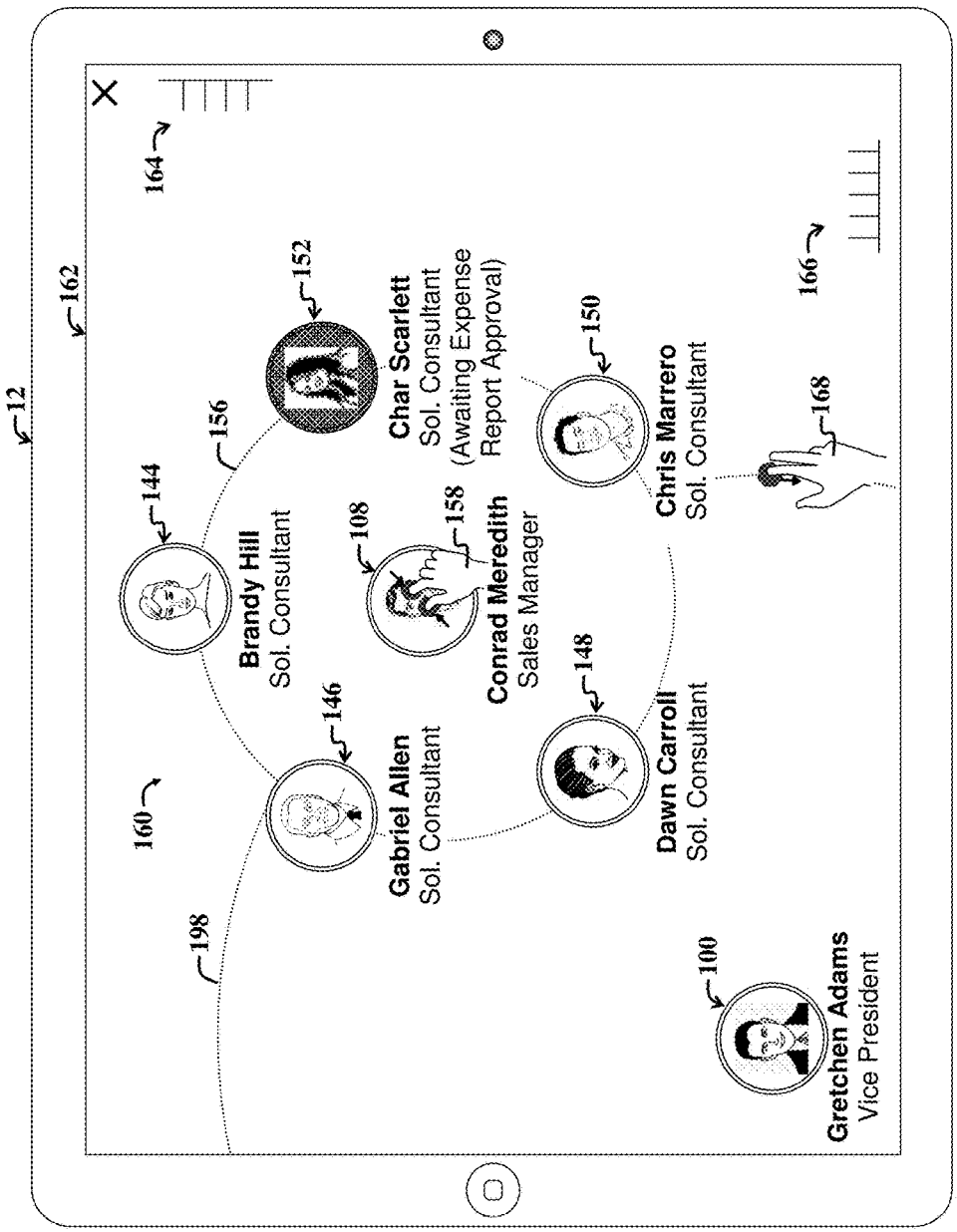
FIG. 4 shows a second example user interface display screen, which may correspond to the first example user interface display screen of FIG. 3 after a navigation action involving spreading of a node to navigate deeper into the associated hierarchy represented by the orbit visualization of FIG. 3, and further illustrating example positioning of a higher level reference node.

FIG. 4 shows a second example UI display screen 162, which may correspond to the first example UI display screen 18 of FIG. 3 after a navigation action involving spreading of a node (i.e., the Conrad Meredith node 108 of FIG. 3 via a two-finger separation gesture 128) to navigate deeper into the associated hierarchy represented by the orbit visualization 20 of FIG. 3.

With reference to FIGS. 3 and 4, a two-finger separation gesture 128 applied to the Conrad Meredith node 108 of FIG. 3 results in a downward navigation of the orbit visualization 20, resulting in display of an updated orbit visualization 160 of FIG. 4.

In the updated orbit visualization 160, the petals 114-122 of the Conrad Meredith node 108 are converted into respective orbiting planets 144-152, which orbit (i.e., are movably positioned about) the central Conrad Meredith node 108 in the updated orbit visualization 160.

The visually encoded petal 122 of FIG. 3 is represented by a visually encoded "Char Scarlett" node 152 in FIG. 4. Additional indicia may accompany the various planets 144-152 in accordance with an amount of display screen space available for the indicia.

The expanded petals, i.e., planets 144-152 of the Conrad Meredith node 108 are confined to a second orbit path 156 that circumscribes the Conrad Meredith node 108. The Gretchen Adams node 100, which represents a parent of the Conrad Meredith node 108, is shown in a corner of the second UI display screen 162.

The first orbit path 198 to which the Conrad Meredith node 108 is approximately confined is also shown. A portion of the first orbit path 198 is shown in the UI display screen 162 passes through an approximate center of the Conrad Meredith node 108. Note however, that nodes may be shown as positioned off-center relative to an orbit path, without departing from the scope of the present teachings.

A swipe gesture 168 along an orbit path, e.g., the first orbit path 198, may cause the Conrad Meredith node 108 and accompanying satellites or planets 144-152 to move along the first orbit path 198 and to result in a reveal of other sibling nodes of the Conrad Meredith node 108, e.g., the Bob Boyle node 106 of FIG. 3.

The first path 198 is said to represent an intermediate path, as it is positioned between different nodes, namely between the Gretchen Adams node 100 and grandchild nodes 144-152 of the Conrad Meredith node 108.

The swipe gesture 168 is said to trigger a reveal of a sibling node that is adjacent to the Conrad Meredith node 108 in the underlying hierarchy represented by the orbit visualization 160. In such a scenario, the Bob Boyle node 106 would become the central node and would represent a new navigation location. Such navigation may represent a type of horizontal navigation.

The Gretchen Adams node 100 shown in FIG. 4 represents a higher level reference node, i.e., it provides a visual reference to a higher level in the hierarchy relative to the hierarchical level of the currently navigated-to navigation location, as represented by the central Conrad Meredith node 108.

Note that while the Gretchen Adams node 100 is shown in a lower-left corner of the UI display screen 162, the positioning of the reference node 100 may vary, without departing from the scope of the present teachings. For example, the Gretchen Adams reference node 100 may be positioned in another corner or along a different portion of the periphery of the updated visualization 160. A periphery of a visualization may be any outer portion of a visualization, which may be defined by a position or display region of an outer most node (i.e., furthest from a center, centroid, or centrally displayed node of an orbit visualization).

In the present example embodiment, a two-finger separation gesture (e.g., the gesture 128 of FIG. 3) applied to a node that lacks siblings or planets (i.e., that represents a bottom-level or bottom tier node) may result in a drill-down software action, resulting in display of a UI display screen showing additional data and/or functionality associated with the node that is selected via application of the two-finger separation gesture applied thereto.

The transition of the first orbit visualization 20 of FIG. 3 to the updated orbit visualization 160 of FIG. 4 may be animated, e.g., to facilitate preservation of context, whereby a user may be more readily able to discern or remember how the updated orbit visualization 160 relates to the initial orbit visualization 20.

The carousel control 134 of FIG. 3 is updated, resulting in an updated carousel control 164. The updated carousel control 164 includes four horizontal bars indicating that the current navigation location represents a fourth navigation step and/or represents a fourth level of the hierarchy represented by the updated orbit visualization 160. Note that the orbiting planets 144-152 correspond to the underlying data objects 64-72 of the bottom tier 78 of the hierarchy 50 represented in FIG. 3.

A pinch gesture 158 may be applied to the Conrad Meredith node 108 to trigger animation of an upward navigation in the associated hierarchy, resulting in transitioning of the updated orbit visualization 160 back to the initial orbit visualization 20 of FIG. 3.

Figure 5:
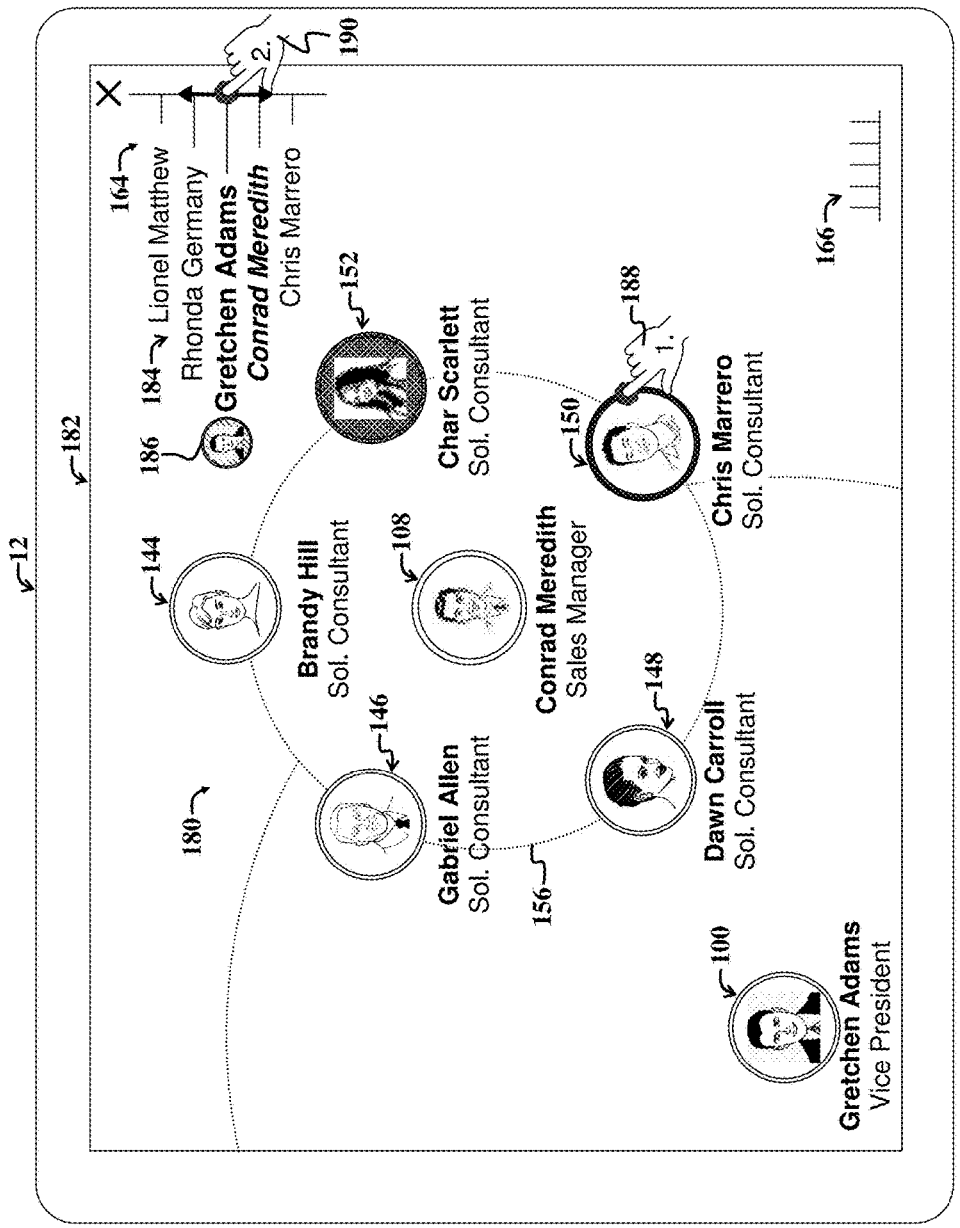
FIG. 5 shows a third example user interface display screen illustrating an updated version of the second example user interface display screen of FIG. 4 after user activation of a carousel control, which provides additional higher level references.

FIG. 5 shows a third example UI display screen 182 and accompanying updated orbit visualization 180. The third example UI display screen 182 represents an updated version of the second example UI display screen 162 of FIG. 4 after user activation of a carousel control 164, which provides additional higher level linked references as part of a hierarchically ordered list 184 activated via the vertical carousel control 164.

In the present example embodiment, the user first selects a node (i.e., the Chris Marrero node 150) via an initial tap gesture 188, and then activates the vertical carousel control 164 via a tap, hold, and slide gesture 190. As the user moves a finger vertically along the vertical carousel control 164, the location of the finger determines which item of the linked list 184 is highlighted or otherwise emboldened and visually distinguished from other items (also called linked breadcrumbs or linked higher level references) in the list 184.

In the present example scenario, the user's finger during the tap, hold, and slide gesture 190 is adjacent to a Gretchen Adams item, which is augmented with an icon 186 representative of the Gretchen Adams node 100.

Once the linked list 184 is displayed, the user may release the finger as part of the gesture 190 to select the link corresponding to the finger location when the finger was released. In the present example scenario, release of the gesture 190 at the Gretchen Adams list item 186 results in transition of the orbit visualization 180 back to the orbit visualization 20 of FIG. 3. This represents a type of upward navigation.

Note that the list items 184 represent higher level references that are associated with the same or higher hierarchical levels than the selected Chris Marrero node 150. Furthermore, note that font sizes of the list items 184 vary in accordance with their distances from the current highlighted item, i.e., the Gretchen Adams item 186. Furthermore, corresponding horizontal bars of the vertical carousel control 164 vary in length in accordance with distance from the currently highlighted list item 186.

Note that while in the present example embodiment, list items shown in the vertical carousel control 164 begin with a selected node, e.g., the Chris Marrero node 150, that embodiments are not limited thereto. For example, if no node is previously selected when the user applies the tap, hold, and slide gesture 190 to the vertical carousel control 164, then items shown in the reference list 184 may be default to showing items beginning with an item corresponding to the central node, e.g., the Conrad Meredith node 108.

The list items 184 may in addition, or alternatively, represent navigation history breadcrumbs, whereby the items in the list 184 represent historical navigation steps and associated navigation locations previously performed by the user.

Note that the horizontal carousel control 166 may also adapt in accordance with a hierarch level of a selected node to indicate a number of related sibling nodes on the same hierarchical level as the selected node 150. In this case, the selected Chris Marrero node 150 is on a hierarchical level (corresponding to the orbit path 156) with five sibling nodes 144-152, which correspond to the five vertical bars of the horizontal carousel control 166.

The horizontal carousel control 166 may operate similarly to the vertical carousel control 164, with the exception that displayed list items would include reference link items to the various sibling nodes 144-152. If a node is not first selected before activating a carousel control, then the selected node defaults to the central node, e.g., the Conrad Meredith node 108.

Figure 6:
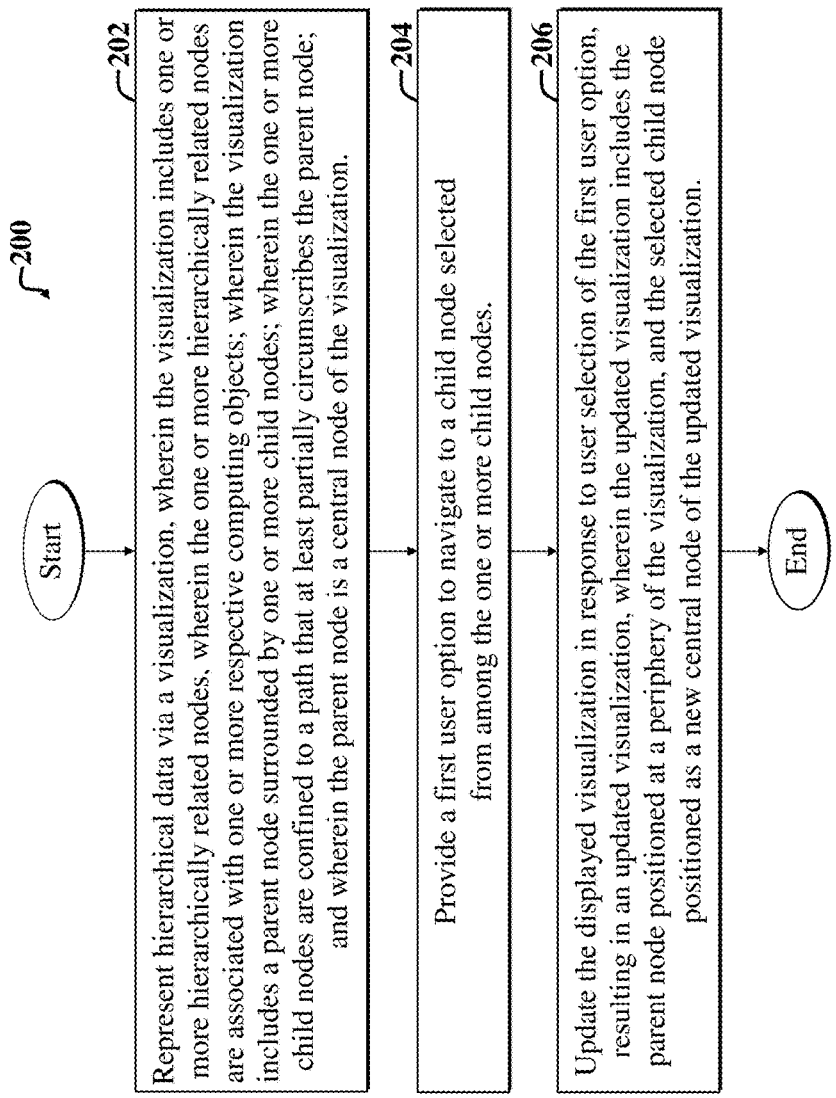
FIG. 6 is a flow diagram of a first example method adapted for use with the embodiments of FIGS. 1-5.

FIG. 6 is a flow diagram of an example method 200 adapted for use with the embodiments of FIGS. 1-5. The first example method 200 is adapted to facilitate preservation of context information during navigation of a visualization.

The first example method 200 includes a representation step 202, which involves representing hierarchical data via a visualization. The visualization includes one or more hierarchically related nodes. The one or more hierarchically related nodes are associated with one or more respective computing objects. The visualization further includes a parent node surrounded by one or more child nodes, wherein the one or more child nodes are confined to a path that at least partially circumscribes the parent node. The parent node is a central node of the visualization.

A subsequent providing step 204 includes providing a first user option to navigate to a child node selected from among the one or more child nodes. The option may be implemented by various mechanisms, e.g., enabling use of a two-finger separation gesture on a child node.

Next, an updating step 206 includes updating the displayed visualization in response to user selection of the first user option. This results in an updated visualization that includes the parent node positioned at a periphery of the visualization and includes the selected child node positioned as a new central node of the updated visualization.

The example method 200 may be altered without departing from the scope of the present teachings. For example, the method 200 may further include displaying one or more grandchild nodes of the parent node about a second path of the updated visualization, wherein the second path at least partially circumscribes the selected child node; and providing a second user option move the one or more grandchild nodes along the second path; providing a third user option to move the parent node along the first path.

The first example method 200 may further include enabling user selection of the first user option in combination with user selection of the child node, via a touch gesture applied to the selected child node. The touch gesture includes a two-finger separation gesture applied to a region of a UI display screen coinciding with the displayed selected child node.

The first example method 200 may further include accessing information characterizing one or more display characteristics of a computing device used to display the visualization and the updated visualization. The one or more display characteristics may include, for example, an indicator that indicates or specifies a size of a display of the computing device.

Figure 7:
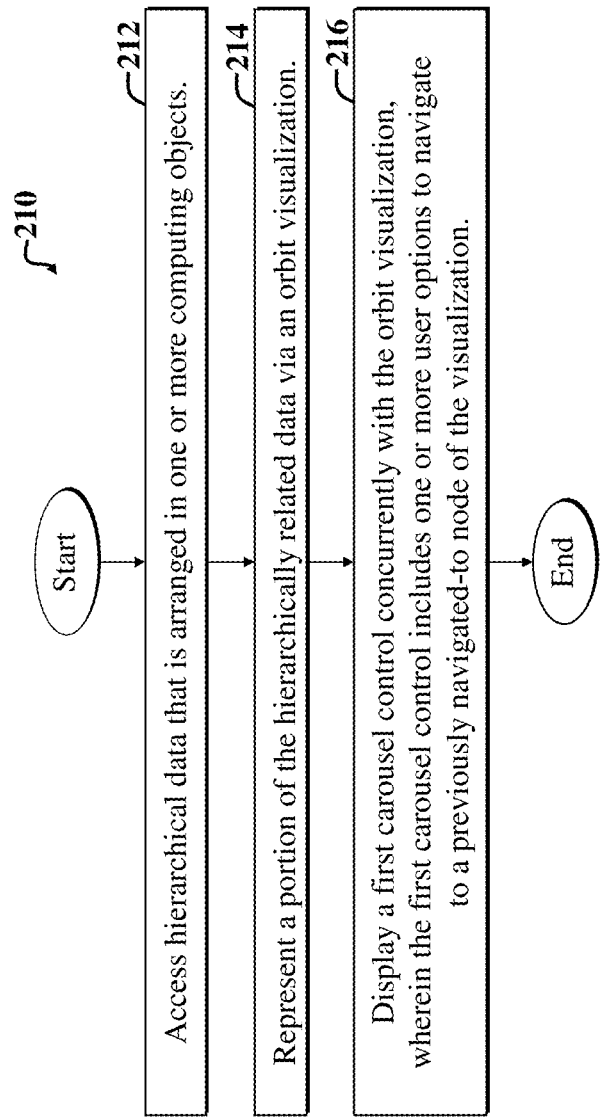
FIG. 7 is a flow diagram of a second example method adapted for use with the embodiments of FIGS. 1-6.

The first example method 200 may further include employing the information to determine a number of hierarchical levels of the orbit visualization to display via a UI display screen presented on the display of the computing device. The first example method 200 may further specify that computing device includes a mobile computing device, and wherein the number of hierarchical levels includes three levels. The three levels or portions thereof may be illustrated in the UI display screen during navigation upward or downward in the hierarchy represented FIG. 7 is a flow diagram of a second example method 210 adapted for use with the embodiments of FIGS. 1-6. The second example method 210 is adapted to facilitate preservation of context information during navigation of a visualization.

The second example method 210 includes a first step 212, which involves accessing hierarchically related data that is arranged in one or more computing objects, such as data objects containing information and/or software methods associated with enterprise employees.

A second step 214 includes representing a portion of the hierarchically related data via an orbit visualization.

A third step 216 includes displaying a first carousel control concurrently with the orbit visualization, wherein the first carousel control includes one or more user options to navigate to a previously navigated-to node of the visualization.

The second example method 210 may be altered, without departing from the scope of the present teachings. For example, the second example method 210 may be augmented to specify that the first carousel control is adapted to display a list of hierarchically related nodes, including a current central node, and one or more ancestor nodes of the central node, wherein each node of the list represents a navigation link to facilitate navigation to a node indicated by the navigation link. Examples of a carousel control 164 and accompanying navigation links 184 are shown in FIG. 5.

The second example method 210 may be further augmented to specify that the first carousel control is adapted to display one or more breadcrumbs for facilitating user navigation of the hierarchically related data represented by the orbit visualization. The first carousel control, which may be oriented horizontally, vertically, or via another orientation, may include a user activatable list of one or more navigation links representing one or more breadcrumbs associated with a currently selected node.

A second horizontal carousel control may be displayed in combination with the vertical carousel control. The second carousel control may include user activatable list of one or more navigation links representing one or more child nodes of a centrally displayed node. The second carousel control may further include a user activatable list of one or more navigation links representing one or more sibling nodes of a currently selected node.

Figure 8:
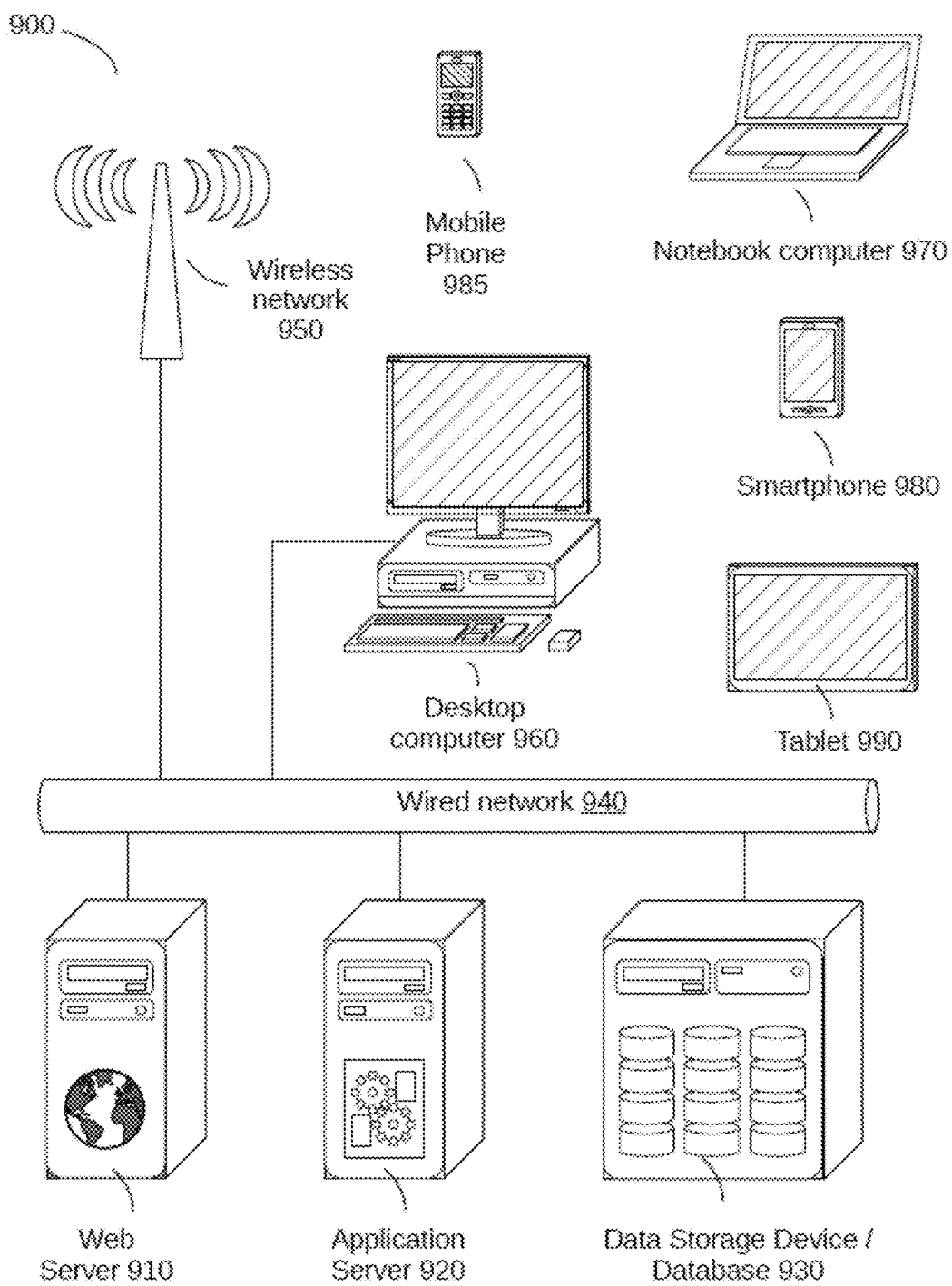
FIG. 8 is a general block diagram of a system for implementing the embodiments of FIGS. 1-7.

FIG. 8 is a block diagram of an example general system 900 for implementing the embodiments of FIGS. 1-7.

The example system 900 is capable of generating and displaying orbit visualizations according to embodiments of the invention. Embodiments may be implemented as stand-alone applications (for example, residing in a user device) or as web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL (Structured Query Language) format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system is one example for executing applications according to an embodiment of the invention. In another embodiment, application server 910, web server 920, and optionally database 930 can be combined into a single server computer application and system. In a further embodiment, virtualization and virtual machine applications may be used to implement one or more of the application server 910, web server 920, and database 930.

In still further embodiments, all or a portion of the web and application serving functions may be integrated into an application running on each of the user computers. For example, a JavaScript application on the user computer may be used to retrieve or analyze data and display portions of the applications.

Although the description has been described with respect to particular embodiments thereof, these particular embodiments are merely illustrative, and not restrictive. For example, while certain embodiments are discussed herein with respect to use of hierarchical visualizations to display enterprise data via mobile device displays, embodiments are not limited thereto. For example, embodiments may be employed with desktop displays and may be used to illustrate and interact with data other than enterprise-related data, without departing from the scope of the present teachings.

Certain embodiments may respond to changes in user device screen orientation, for instance they may change an orientation of the swim lane or of the panel, or they may change a number of simultaneously displayed tiles.

Certain embodiments may limit parts of a hierarchy viewable for a user based on a user authorization level. And embodiments may limit the information—contained in a data item (should be "shown in association with a node")—that is accessible for reading or writing by a user, based on the user's authorization level.

Certain embodiments may further allow for user interaction in various other ways. Some user input gestures may be tied to functions that intuitively correspond to the gesture, such as scrolling upon receiving a user swipe input in the direction of the visualization orientation. Other user inputs may be tied to functions based on a correspondence in frequency of use, such as using a tap gesture to activate a card and navigate in the hierarchy.

More generally, since any user input could be tied to any orbit visualization function, a user input may be tied to a function based on the need to provide user-friendly interaction capabilities. Since functionality requirements may vary based on the types of hierarchy presented and based on an application in which an orbit visualization may be used, different embodiments may provide different mappings between user inputs and visualization functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for facilitating preservation of context information during navigation of a displayed visualization in a computing environment, the computing environment including one or more computing devices in communication with a software application, wherein the software application executes software, wherein the software provides displayable information accessible to the one or more computing devices, a computing device of the one or more computing devices executing the steps of the method, the method comprising:

determining at least four consecutive hierarchical levels of data objects to display via the displayed visualization;

presenting an orbit visualization in the displayed visualization;

simultaneously displaying, in the orbit visualization, the at least four consecutive hierarchy levels of the data objects as a group of nodes allocated to a first tier level, a second tier level, a third tier level, and a fourth tier level coinciding with the at least four consecutive hierarchy levels, displaying a first set of the at least four consecutive hierarchy levels using a first set of nodes from the group of nodes configured as a first set of planets using a non-overlapping visualization of the first set of nodes, and a second set of the four tier levels using a second set of nodes from the group of nodes configured as a second set of planets that partially overlap using an overlapping visualization simulating visual depth between the second set of nodes included in the second set of the four tier levels;

displaying a first node from the first set of nodes positioned in a corner of the orbit visualization at the first tier level representing a first hierarchical level of the at least four hierarchical levels;

displaying from the second set of nodes a plurality of parent nodes as a second set of planets positioned at the third tier level representing a third hierarchy level and confined to a second planetary position defined by a corresponding third orbit path at least partially circumscribing the second node, wherein at least two parent nodes of the plurality of parent nodes have child nodes that are included in the second set of nodes, wherein the child nodes are presented as a third set of planets positioned at the fourth tier level representing data objects at a fourth hierarchy level;

wherein a first parent node from the second set of nodes has at least one child node positioned at the fourth tier level in a fourth orbit path circumscribing the first parent node, wherein the fourth orbit path visually represents the fourth tier level, and a second parent node which includes one or more child nodes visually positioned partially below the second parent node in a third planetary position configured to position the one or more child nodes about a boundary of the second parent node to visually represent the one or more child nodes as individual petals disposed about the boundary of the second parent node, wherein the individual petals are configured to simulate visual depth to visually represent an overlapping hierarchy display of the one or more child nodes positioned at the fourth tier level;

receiving a gesture input from a user to set the second parent node as a selected node;

in response to the gesture input, setting the parent node as the selected node;

providing a gesture input option applied to the selected node to reposition the one or more child nodes from the third planetary position presenting the overlapping visualization and to a fourth planetary position along a fifth orbit path presenting the non-overlapping visualization;

wherein in a first state, in response to the gesture input option applied to the selected node by the user, triggering an animation positioning the one or more child nodes from the third planetary position to the fourth planetary position;

displaying a carousel control concurrently with the orbit visualization, wherein the carousel control indicates a navigation location currently being shown by the orbit visualization, wherein the carousel control provides an option to facilitate navigation horizontally across the first set of nodes representing a set of hierarchical levels represented by the non-overlapping visualization and vertically to facilitate navigation vertically to navigate among the second set of nodes representing another set of hierarchical levels represented by the overlapping visualization;

receiving a position touch gesture signal from a user input mechanism via a second transition motion gesture to a control portion of the carousel control to initiate navigation of the orbit visualization to a second state;

transitioning display of the selected node and the one or more child nodes in accordance with the navigation from the first state to the second state to update the orbit visualization, by:

initiating a navigation animation configured to visually alter the orbit visualization from the first state to the second state through animation by:

removing the first node from the corner of the displayed visualization;

replacing the first node with the second node by positioning the second node from a first location in the displayed visualization to the corner of the displayed visualization; and transitioning the selected node and the one or more child nodes from a second location in the displayed visualization to the first location on the display.

2. The method of claim 1, further including in response to a selection gesture signal, selecting the at least one child node of the first parent node.

3. The method of claim 2, further including providing a second user option to move the at least one child node along the fourth orbit path.

4. The method of claim 2, further including providing a third user option to move the plurality of parent nodes along the third orbit path.

5. The method of claim 1, further including enabling user selection of a the first user option configured to initiate the navigation in combination with user selection of the at least one child node, via a touch gesture applied to the selected node.

6. The method of claim 5, wherein the touch gesture includes a two-finger separation gesture applied to a region of a user interface display screen coinciding with the selected node.

7. The method of claim 1, further including accessing information characterizing one or more display characteristics of a computing device used to display the displayed visualization and the updated orbit visualization.

8. The method of claim 7, wherein the one or more display characteristics include an indicator of a size of a display of the computing device.

9. The method of claim 8, further including employing the information to determine a number of hierarchical levels of the displayed visualization and updated displayed visualization to display via a user interface display screen presented on the display of the computing device.

10. The method of claim 9, wherein the computing device includes a mobile computing device, and wherein the number of hierarchical levels includes the at least four consecutive hierarchy levels.

11. The method of claim 10, further including illustrating at least three hierarchy levels of the at least four consecutive hierarchy levels or portions thereof in the user interface display screen during navigation upward or downward in the hierarchical levels represented via the displayed visualization and updated displayed visualization.

12. A method for facilitating preservation of context information during navigation of a displayed visualization, the method comprising:

determining at least four consecutive hierarchical levels of data objects to display via the displayed visualization representing hierarchically related data;

determining at least four consecutive hierarchical levels of data objects to display via the displayed visualization;

simultaneously displaying, in the orbit visualization, the at least four consecutive hierarchy levels of the data objects as a group of nodes allocated to a first tier level, a second tier level, a third tier level, and a fourth tier level coinciding with the at least four consecutive hierarchy levels, displaying a first set of the at least four consecutive hierarchy levels using a first set of nodes from the group of nodes configured as a first set of planets using a non-overlapping visualization of the first set of nodes, and a second set of the four tier levels using a second set of nodes from the group of nodes configured as a second set of planets that partially overlap using an overlapping visualization simulating visual depth between the second set of nodes included in the second set of the four tier levels;

displaying a first node from the first set of nodes positioned in a corner of the orbit visualization at the first tier level representing a first hierarchical level of the at least four hierarchical levels;

displaying a second node from the first set of nodes as a planet from the first set of planets at the second tier level representing a second hierarchical level, wherein the second node is positioned at a first location and confined to a first planetary position defined by a corresponding second orbit path that at least partially circumscribes the first node;

displaying from the second set of nodes a plurality of parent nodes as a second set of planets positioned at the third tier level representing a third hierarchy level and confined to a second planetary position defined by a corresponding third orbit path at least partially circumscribing the second node, wherein at least two parent nodes of the plurality of parent nodes have child nodes that are included in the second set of nodes, wherein the child nodes are presented as a third set of planets positioned at the fourth tier level representing data objects at a fourth hierarchy level;

wherein a first parent node from the second set of nodes has at least one child node positioned at the fourth tier level in a fourth orbit path circumscribing the first parent node, wherein the fourth orbit path visually represents the fourth tier level, and a second parent node which includes one or more child nodes visually positioned partially below the second parent node in a third planetary position configured to position the one or more child nodes about a boundary of the second parent node to visually represent the one or more child nodes as individual petals disposed about the boundary of the second parent node, wherein the individual petals are configured to simulate visual depth to visually represent an overlapping hierarchy display of the one or more child nodes positioned at the fourth tier level;

wherein in a first state, providing a gesture input configured responsive to user input to transition at least one child node of the one or more child nodes from the overlapping visualization to the non-overlapping visualization while remaining at the fourth tier level;

displaying a first carousel control concurrently with the orbit visualization, wherein the first carousel control includes one or more user options to navigate horizontally to nodes in the first set of nodes represented by the non-overlapping visualization, and navigate vertically to other nodes in the second set of nodes represented by the overlapping visualization, to navigate to a previously navigated-to node of the displayed visualization, and wherein the first carousel control indicates a navigation location currently being shown by the orbit visualization;

employing the first carousel control to select the second parent node;

employing the first carousel control to set the second parent node as the selected node;

receiving a tap and hold gesture input from a first user option of the first carousel control to initiate navigation of the orbit visualization during a second state where the second parent node and the plurality of parent nodes are moved from a third location along the third orbit path to the first location on the display;

transitioning display of the second node and the plurality of parent nodes in accordance with the navigation from the first state to the second state to update the orbit visualization, by:

initiating a navigation animation configured to visually alter the orbit visualization from the first state to the second state through animation by:

removing the first node from the corner of the displayed visualization;

replacing the first node with the second node by positioning the second node from the first location in the displayed visualization to the corner of the displayed visualization; and transitioning the selected node and the one or more child nodes from a second location in the displayed visualization to the first location on the display.

13. The method of claim 12, wherein the first carousel control is adapted to display a list of hierarchically related nodes, including the second node, and one or more ancestor nodes of the second node, wherein each node of the list of hierarchically related nodes represents a navigation link to facilitate navigation to a node indicated by the navigation link.

14. The method of claim 12, wherein the first carousel control is adapted to display one or more breadcrumbs for facilitating user navigation of the hierarchically related data represented by the orbit visualization.

15. The method of claim 14, wherein the first carousel control includes a user activatable list of one or more navigation links representing one or more breadcrumbs associated with a currently selected node.

16. The method of claim 14, wherein the first carousel control is oriented vertically.

17. The method of claim 12, further including displaying a second carousel control concurrently with the first carousel control.

18. The method of claim 17, wherein the second carousel control includes a user activatable list of one or more navigation links representing one or more child nodes of a centrally displayed node; wherein the second carousel control includes a user activatable list of one or more navigation links representing one or more sibling nodes of a currently selected node; and wherein the second carousel control is oriented horizontally.

19. An apparatus for facilitating preservation of context information during navigation of a displayed visualization in a computing environment, the computing environment including one or more computing devices in communication with a software application, wherein the software application executes software, wherein the software provides displayable information accessible to the one or more computing devices, a computing device of the one or more computing devices configured to perform operations comprising:

determining at least four consecutive hierarchical levels of data objects to display via the displayed visualization;

presenting an orbit visualization in the displayed visualization;

simultaneously displaying, in the orbit visualization, the at least four consecutive hierarchy levels of the data objects as a group of nodes allocated to a first tier level, a second tier level, a third tier level, and a fourth tier level coinciding with the at least four consecutive hierarchy levels, displaying a first set of the at least four consecutive hierarchy levels using a first set of nodes from the group of nodes configured as a first set of planets using a non-overlapping visualization of the first set of nodes, and a second set of the four tier levels using a second set of nodes from the group of nodes configured as a second set of planets that partially overlap using an overlapping visualization simulating visual depth between the second set of nodes included in the second set of the four tier levels;

displaying a first node from the first set of nodes positioned in a corner of the orbit visualization at the first tier level representing a first hierarchical level of the at least four hierarchical levels;

displaying a second node from the first set of nodes as a planet from the first set of planets at the second tier level representing a second hierarchical level, wherein the second node is confined to a first planetary position defined by a corresponding second orbit path that at least partially circumscribes the first node;

displaying from the second set of nodes a plurality of parent nodes as a second set of planets positioned at the third tier level representing a third hierarchy level and confined to a second planetary position defined by a corresponding third orbit path at least partially circumscribing the second node, wherein at least two parent nodes of the plurality of parent nodes have child nodes that are included in the second set of nodes, wherein the child nodes are presented as a third set of planets positioned at the fourth tier level representing data objects at a fourth hierarchy level;

wherein a first parent node from the second set of nodes has at least one child node positioned at the fourth tier level in a fourth orbit path circumscribing the first parent node, wherein the fourth orbit path visually represents the fourth tier level, and a second parent node which includes one or more child nodes visually positioned partially below the second parent node in a third planetary position configured to position the one or more child nodes about a boundary of the second parent node to visually represent the one or more child nodes as individual petals disposed about the boundary of the second parent node, wherein the individual petals are configured to simulate visual depth to visually represent an overlapping hierarchy display of the one or more child nodes positioned at the fourth tier level;

receiving a gesture input from a user to set the second parent node as a selected node;

in response to the gesture input, setting the second parent node as the selected node;

providing a gesture input option applied to the selected node to reposition the one or more child nodes from the third planetary position presenting the overlapping visualization to a fourth planetary position along a fifth orbit path presenting the non-overlapping visualization;

displaying a carousel control concurrently with the orbit visualization, wherein the carousel control indicates a navigation location currently being shown by the orbit visualization, wherein the carousel control provides an option to facilitate navigation horizontally across the first set of nodes representing a set of hierarchical levels represented by the non-overlapping visualization and vertically to facilitate navigation vertically to navigate among the second set of nodes representing another set of hierarchical levels represented by the overlapping visualization;

receiving a position touch gesture signal from a user input mechanism via a second transition motion gesture to a control portion of the carousel control to initiate navigation of the orbit visualization to a second state;

transitioning display of the selected node and the one or more child nodes in accordance with the navigation from the first state to the second state to update the orbit visualization, by:

initiating a navigation animation configured to visually alter the orbit visualization from the first state to the second state through animation by:

removing the first node from the corner of the displayed visualization;

replacing the first node with the second node by positioning the second node from a first location in the displayed visualization to the corner of the displayed visualization; and transitioning the selected node and the one or more child nodes from a second location in the displayed visualization to the first location on the display.

20. A non-transitory storage medium including instructions executable by one or more computing devices of an enterprise computing environment for facilitating preservation of context information during navigation of a displayed visualization in the enterprise computing environment, the enterprise computing environment including a computing device of the one or more computing devices in communication with a software application, wherein the software application executes software, wherein the software application provides displayable information accessible to the one or more computing devices, the non-transitory storage medium including instructions for:

determining at least four consecutive hierarchical levels of data objects to display via the displayed visualization;

presenting an orbit visualization in the displayed visualization;

simultaneously displaying, in the orbit visualization, the at least four consecutive hierarchy levels of the data objects as a group of nodes allocated to a first tier level, a second tier level, a third tier level, and a fourth tier level coinciding with the at least four consecutive hierarchy levels, displaying a first set of the at least four consecutive hierarchy levels using a first set of nodes from the group of nodes configured as a first set of planets using a non-overlapping visualization of the first set of nodes, and a second set of the four tier levels using a second set of nodes from the group of nodes configured as a second set of planets that partially overlap using an overlapping visualization simulating visual depth between the second set of nodes included in the second set of the four tier levels;

displaying a first node from the first set of nodes positioned in a corner of the orbit visualization at the first tier level representing a first hierarchical level of the at least four hierarchical levels;

displaying a second node from the first set of nodes as a planet from the first set of planets at the second tier level representing a second hierarchical level, wherein the second node is confined to a first planetary position defined by a corresponding second orbit path that at least partially circumscribes the first node;

displaying from the second set of nodes a plurality of parent nodes as a second set of planets positioned at the third tier level representing a third hierarchy level and confined to a second planetary position defined by a corresponding third orbit path at least partially circumscribing the second node, wherein at least two parent nodes of the plurality of parent nodes have child nodes that are included in the second set of nodes, wherein the child nodes are presented as a third set of planets positioned at the fourth tier level representing data objects at a fourth hierarchy level;

wherein a first parent node from the second set of nodes has at least one child node positioned at the fourth tier level in a fourth orbit path circumscribing the first parent node, wherein the fourth orbit path visually represents the fourth tier level, and a second parent node which includes one or more child nodes visually positioned partially below the second parent node in a third planetary position configured to position the one or more child nodes about a boundary of the second parent node to visually represent the one or more child nodes as individual petals disposed about the boundary of the second parent node, wherein the individual petals are configured to simulate visual depth to visually represent an overlapping hierarchy display of the one or more child nodes positioned at the fourth tier level;

receiving a gesture input from a user to set the second parent node as a selected node;

in response to the gesture input, setting the second parent node as the selected node;

providing a gesture input option applied to the selected node to reposition the one or more child nodes from the third planetary position presenting the overlapping visualization and to a fourth planetary position along a fifth orbit path presenting the non-overlapping visualization;

wherein in a first state, in response to the gesture input option applied to the selected node by the user, triggering an animation positioning the one or more child nodes from the third planetary position to the fourth planetary position;

displaying a carousel control concurrently with the orbit visualization, wherein the carousel control indicates a navigation location currently being shown by the orbit visualization, wherein the carousel control provides an option to facilitate navigation horizontally across the first set of nodes representing a set of hierarchical levels represented by the non-overlapping visualization and vertically to facilitate navigation vertically to navigate among the second set of nodes representing another set of hierarchical levels represented by the overlapping visualization;

receiving a position touch gesture signal from a user input mechanism via a second transition motion gesture to a control portion of the carousel control to initiate navigation of the orbit visualization to a second state;

transitioning display of the selected node and the one or more child nodes in accordance with the navigation from the first state to the second state to update the orbit visualization, by:

initiating a navigation animation configured to visually alter the orbit visualization from the first state to the second state through animation by:

removing the first node from the corner of the displayed visualization;

replacing the first node with the second node by positioning the second node from a first location in the displayed visualization to the corner of the displayed visualization; and transitioning the selected node and the one or more child nodes from a second location in the displayed visualization to the first location on the display.

* * * * *

UNITED STATES PATENT AND TRADEMARK OFFICE
CERTIFICATE OF CORRECTION

PATENT NO. : 10,261,661 B2
APPLICATION NO. : 14/684159
DATED : April 16, 2019
INVENTOR(S) : Ramanathan et al.

Page 1 of 1

It is certified that error appears in the above-identified patent and that said Letters Patent is hereby corrected as shown below:

In the Specification

In Column 1, Line 46, delete "2016;" and insert -- 2016. --, therefor.

In the Claims

In Column 23, Line 42, in Claim 5, "a the" and insert -- a --, therefor.

Signed and Sealed this
Third Day of November, 2020

Andrei Iancu
*Director of the United States Patent and Trademark Office*